Dec. 29, 1942. S. L. PHILLIPS 2,306,562
TRIPOD FOR MOTION PICTURE MACHINES
Filed Feb. 25, 1942 2 Sheets-Sheet 1

S. L. Phillips INVENTOR.

Dec. 29, 1942.  S. L. PHILLIPS  2,306,562
TRIPOD FOR MOTION PICTURE MACHINES
Filed Feb. 25, 1942  2 Sheets-Sheet 2
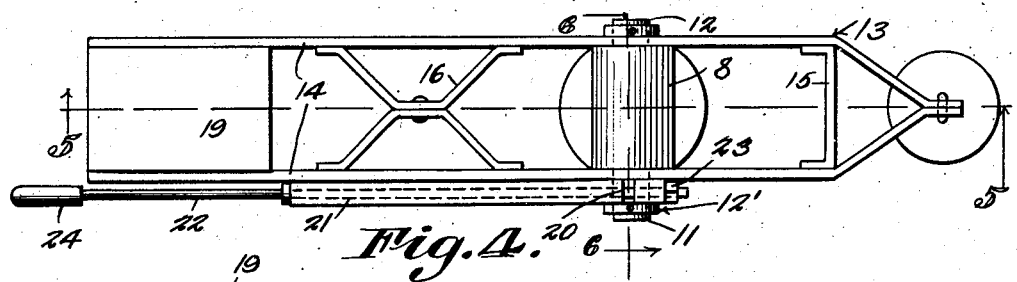
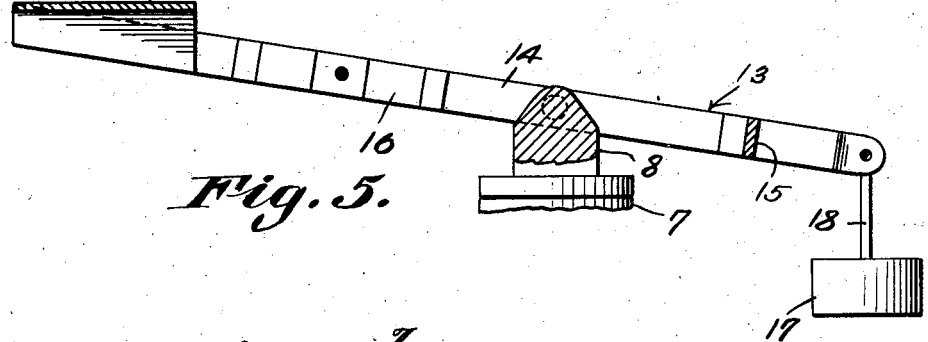
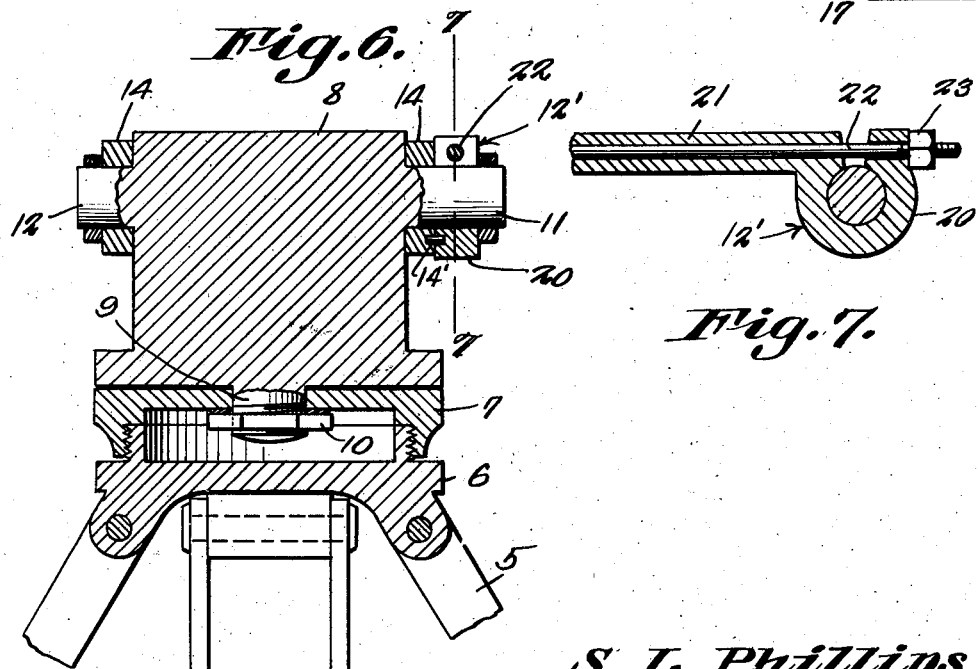
S. L. Phillips
INVENTOR.
BY Patented Dec. 29, 1942

2,306,562

UNITED STATES PATENT OFFICE 2,306,562

TRIPOD FOR MOTION PICTURE MACHINES

Stanley Lamont Phillips, Mount Vernon, Ohio, assignor of one-fourth to Wilbur E. Purdy, Mount Vernon, Ohio Application February 25, 1942, Serial No. 432,332

1 Claim. (Cl. 248—183)

This invention relates to tilt or panorama heads for tripods designed primarily for use in taking motion pictures, the primary object of the invention being to provide a tripod head which may be adjusted to various angular positions with respect to the tripod, eliminating the necessity of moving the tripod or support where tilting and panorama views are recorded.

An important object of the invention is to provide a tripod head which may be tilted on a radius, to the end that the third dimensional effect is achieved, thereby especially enhancing the quality of the pictures taken with a camera mounted on the supporting head.

Another object of the invention is to provide a tripod head which will be counterbalanced, with the result that the motion picture machine mounted on the tripod will be automatically held in its position of adjustment.

Referring to the drawings:

Figure 4 is an enlarged plan view of the frame supported by the head.

Figure 5 is a sectional view taken on line 5—5 of Figure 4.

Figure 6 is a sectional view taken on line 6—6 of Figure 4.

Figure 7 is a sectional view taken on line 7—7 of Figure 6.

Figure 1:
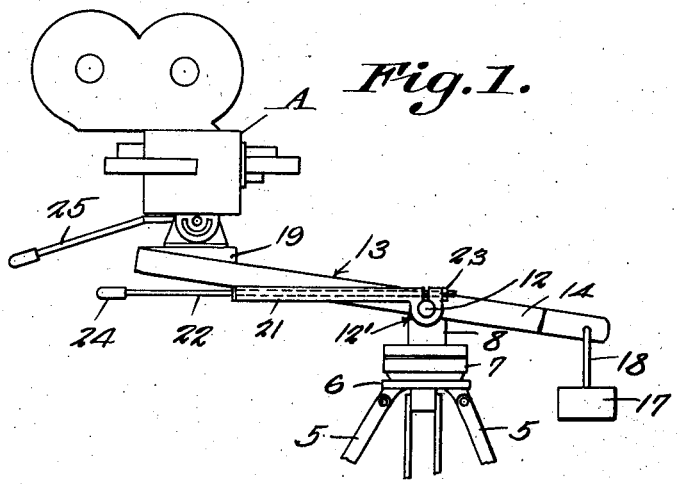
Figure 1 is a side elevational view of a tripod, constructed in accordance with the invention.
Figure 2:
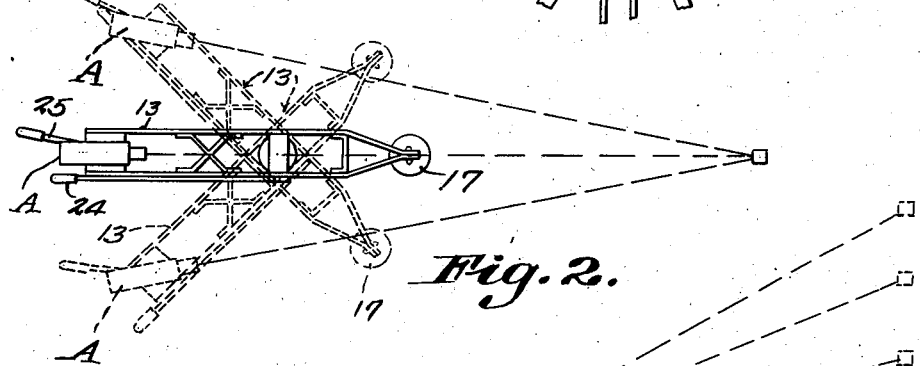
Figure 2 is a plan view thereof.
Figure 3:
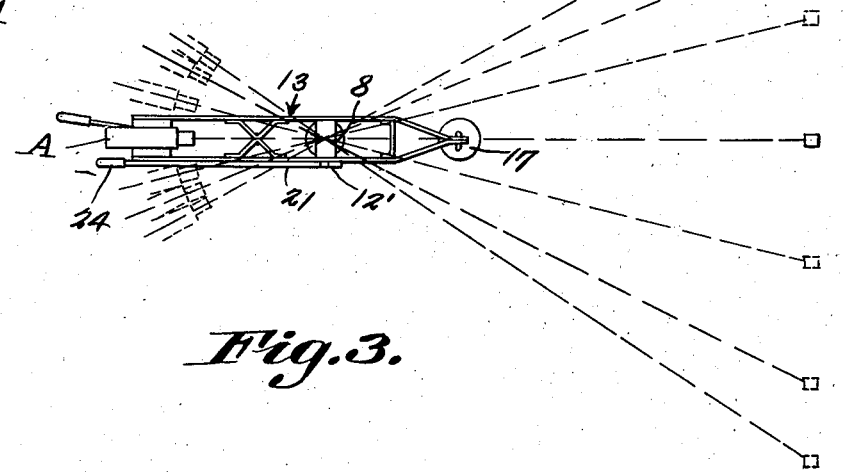
Figure 3 is a plan view of the tripod and motion picture machine support illustrating the movements of the head, while making a panorama picture.

Referring to the drawings in detail the legs of the tripod or support, are indicated by the reference character 5, the upper ends of the legs being connected to the head plate 6, which is formed with an upstanding annular flange externally threaded to receive the threads of the removable head plate 7.

The head of the tripod, is indicated by the reference character 8, and is provided with a depending stem 9 formed with threads, that extends through a central opening in the removable head plate 7. A nut indicated at 10 is positioned on the threaded end of the stem to secure the head 8 to the removable head plate 7.

Extending from opposite sides of the head 8, are stub shafts 11 and 12, the shaft 11 being slightly longer than the shaft 12, to accommodate the securing member 12' that secures the supporting frame, to be hereinafter more fully described, in its positions of adjustment.

These shafts 11 and 12 provide pivots for the supporting frame indicated generally by the reference character 13, the frame 13 embodying side rails 14 that are held in spaced relation by means of the brace bars 15 and 16.

The side rails 14 converge at one end of the frame, and are connected, as clearly shown by Figure 4 of the drawings. A weight indicated at 17 hangs from the rod 18 that extends through openings in the connected ends of the side rails 14, the weight being designed to counterbalance the weight of the camera, which in the present showing is indicated at A. The camera is secured in position on the platform 19 that connects the ends of the side rails 14, opposite to the end of the supporting frame to which the weight 17 is secured.

The securing member embodies a split collar 20 formed at one end of the tube 21, through which the rod 22 extends, the rod 22 being provided with a threaded end on which the nut 23 is positioned. One of the side rails 14 is formed with an opening for the reception of the pin 14', which also extends into an opening of the split collar 20, connecting the securing member and supporting frame. A handle indicated at 24 is formed on one end of the rod 22 and affords means whereby the rod may be rotated to cause the split collar 20 to grip the stub shaft 11, or loosen its grip on the stub shaft when it is desired to make an adjustment of the frame, in taking pictures.

An arm indicated at 25 extends from the camera base, and provides means whereby the camera may be tilted with respect to the supporting frame, to better adapt the camera for taking pictures.

From the foregoing it will be seen that due to the construction shown and described, the camera supported on the tripod constructed in accordance with the invention may tilt or panoram on a radius, instead of a pivot, with the result that all stationary objects in the field covered by the camera lens or similar device, visually change in relative position to each other, thus emphasizing space between the objects, and producing an exceptionally beautiful third dimensional effect in motion pictures, or for use with television.

Having thus described the invention, what is claimed is:

A panning and tilting mounting for cameras, comprising a tripod including a stationary head plate, a hollow head plate secured to the stationary head plate, a head pivotally mounted on the hollow head plate, stub shafts extending from the head, a supporting frame mounted for pivotal movement on the stub shafts, a securing member including a tubular member having a split collar at one end thereof, the split collar being fitted over one of the stub shafts, said tubular member being connected to the frame and being disposed longitudinally of the frame, a rod having a threaded end, extended through the tubular member, a nut on the threaded end of said rod, and said rod adapted to be rotated in said nut, whereby the split collar is tightened on the shaft, securing the frame in various positions of adjustment on the tripod.

STANLEY LAMONT PHILLIPS.